United States Patent [19]

Ashauer

[11] 4,263,815
[45] Apr. 28, 1981

[54] AUTOMOBILE TRANSMISSION HAVING NOISELESS SHIFTING FOR REVERSE GEAR

[75] Inventor: Karl Ashauer, Wolfsburg, Fed. Rep. of Germany

[73] Assignee: Volkswagenwerk Aktiengesellschaft, Wolfsburg, Fed. Rep. of Germany

[21] Appl. No.: 22,688

[22] Filed: Mar. 21, 1979

[30] Foreign Application Priority Data

Mar. 28, 1978 [DE] Fed. Rep. of Germany ....... 2813292

[51] Int. Cl.³ .............................................. F16H 3/38
[52] U.S. Cl. ..................................... 74/339; 74/411.5
[58] Field of Search ....................... 74/352, 339, 411.5

[56] References Cited

U.S. PATENT DOCUMENTS

| | | | |
|---|---|---|---|
| 2,085,019 | 6/1937 | Griswold | 74/339 X |
| 2,857,777 | 10/1958 | Porter | 74/DIG. 10 |
| 2,892,524 | 6/1959 | Sinclair | 74/339 X |
| 3,425,527 | 2/1969 | Wolf | 74/339 X |

Primary Examiner—Andrew V. Kundrat
Attorney, Agent, or Firm—Brumbaugh, Graves, Donohue & Raymond

[57] ABSTRACT

An automobile transmission of the type having a drive shaft with a reverse gear thereon adapted to engage shift gear axially displaceable on a stationary axle. The shift gear is movable between an engaged position with the reverse gear for shifting into reverse and a position disengaged from the reverse gear. A synchromesh ring gear is provided on the drive shaft having a tooth profile corresponding to the reverse gear, thereby adapted to mesh with the shift gear, and is positioned to engage the shift gear when the shift gear is in the disengaged position. Preferably, the ring gear is formed of a non-metallic material; thus even though the ring gear constantly engages the shift gear when the transmission is not in reverse, virtually no transmission noise is generated.

7 Claims, 1 Drawing Figure

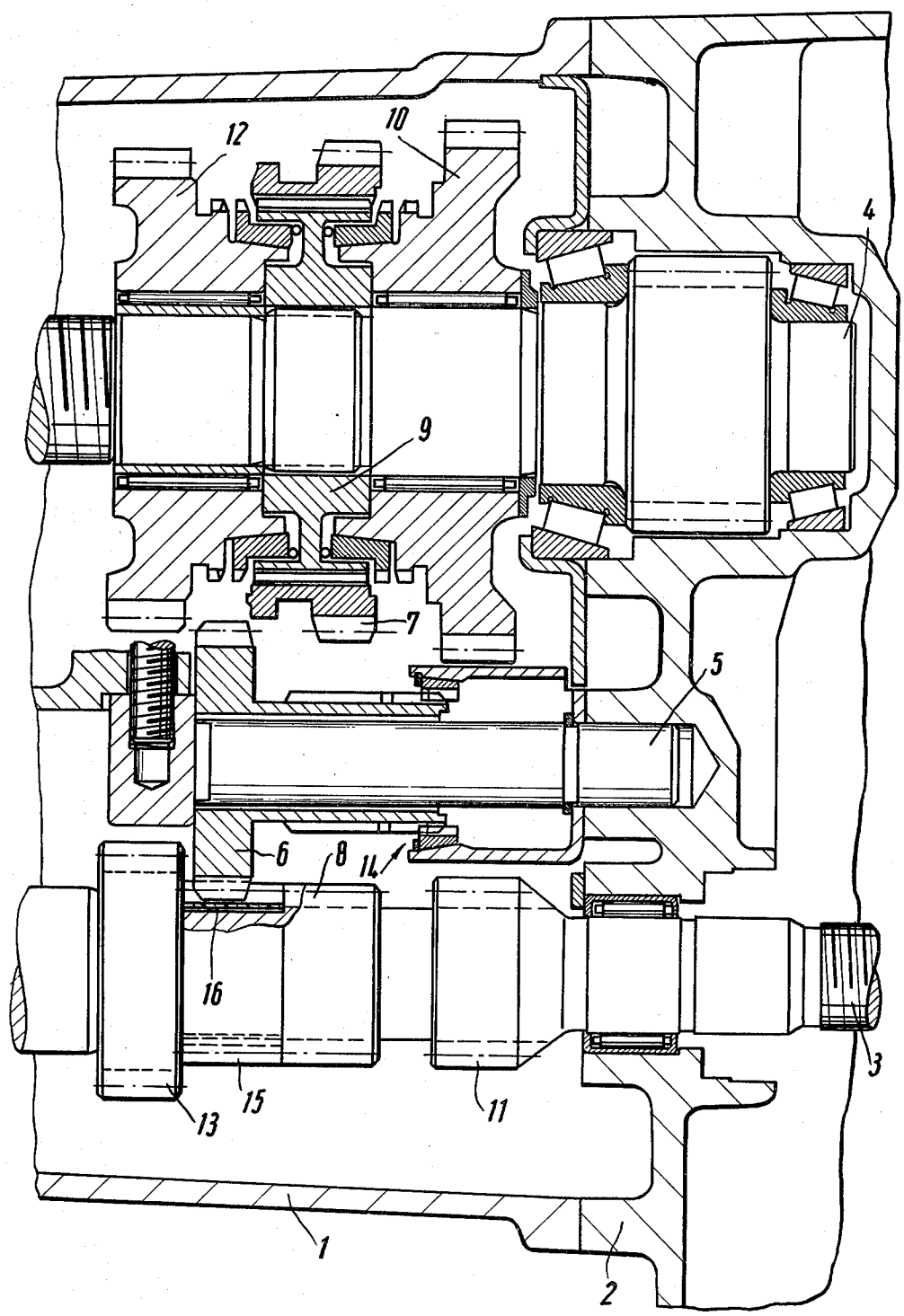

AUTOMOBILE TRANSMISSION HAVING NOISELESS SHIFTING FOR REVERSE GEAR

BACKGROUND OF THE INVENTION

This invention relates to an improved automobile transmission of the type having a reverse gear on the drive shaft which cooperates with a shift gear axially displaceable on a stationary axle.

In automobile transmissions of this type, the shift gear is rotatable on the stationary axle and is axially displaceable along the stationary axle to move into and out of engagement with the reverse gear. When shifted into reverse, the shift gear first engages the reverse gear, which is on the drive shaft, and once having engaged the reverse gear, with further axial displacement, engages a counter gear wheel fixed on the transmission output shaft.

When the shift gear engages first the reverse gear, and also secondly the counter gear on the output shaft, however, noises and shifting shocks may occur. Since the drive shaft is coupled to the engine, it will rotate with the engine as long as the clutch is engaged. Even after the clutch is disengaged to shift into reverse, however, the drive shaft and reverse gear will continue rotating due to inertia. Thus the rotating reverse gear has to mesh with the stationary shift gear, which will cause gear grinding. Moreover, once engaged, the reverse gear will cause the shift gear to rotate. Since the automobile and thus output shaft are normally stationary when shifting into reverse, once again a rotating gear (shift gear) engages a stationary gear (counter gear on the output shaft), which results in grinding.

In commonly owned U.S. patent application Ser. No. 961,773, filed Nov. 17, 1978, an arrangement for a noiseless engagement of the shift gear with the counter gear is disclosed, in which a synchronizing device is provided on the shaft to brake the rotation of the shift gear before it engages the counter gear. An arrangement for eliminating the shifting noises between the shift gear and the reverse gear is also proposed wherein the two gears are permanently engaged.

While this eliminates shifting noises between the reverse gear and the shift gear, the axial enlargement (width) of the reverse gear needed to effect such an arrangement is difficult in practice to manufacture. The reverse gear is formed by a gear shaper cutter which cuts the gear out of the drive shaft. In order to do so, a sufficiently wide relief groove is needed on at least one side of the gear, at least in the engaging area of the adjacent gear, which relief groove would no longer be available if the width (axial length) of the reverse gear were enlarged, as would be required if the reverse gear were to engage the shift gear through the entire axial displacement of the shift gear. Moreover, the constant meshing of the shift gear with reverse gear, as would then occur in all operating states of the engine, whether forward or reverse, itself generates considerable noise and is thus undesirable.

SUMMARY OF THE INVENTION

The present invention is an improved automobile transmission of the type having a drive shaft with a reverse gear thereon adapted to engage a shift gear axially displaceable on a stationary axle, which provides for shifting into reverse gear without producing the customary gear grinding and associated noise and transmission shock.

More particularly, in accordance with the present invention, a synchromesh ring gear is provided on the drive shaft having a tooth profile corresponding to that of the reverse gear and thus adapted to mesh with the shift gear, and positioned to engage the shift gear when the shift gear is in its disengaged position from the reverse gear. In accordance with this design, the shift gear, in all operating states of the transmission, engages either the reverse gear or the ring gear. Since the ring gear and reverse gear rotate on a common drive shaft and have corresponding tooth configurations, the shift gear will already be rotating at the same speed as the reverse gear and may be axially shifted from the ring gear to the reverse gear smoothly and without any griding noises.

Furthermore, when the shift gear is in its disengaged position from the reverse gear, no load is transmitted between the shift gear and the ring gear. Therefore, the ring gear may consist of a non-metallic material, and preferably a relatively resilient material such as plastic. When formed of such material, gearing noises between the ring gear and the shift gear will not be produced when the two are engaged.

The ring gear is fixed on the drive shaft in any suitable manner, for example by prestressing, cementing, or vulcanizing onto the shaft. Preferably, the area where the ring is to be attached the drive shaft is provided with a form-fitting configuration to cooperate with the ring gear, for example knurling, or a bore or grooves, in order to attach the ring gear more securely to the drive shaft.

BRIEF DESCRIPTION OF THE DRAWING

For a better understanding of the invention, reference may be had to the following detailed description, taken in conjunction with the accompanying drawing, which is a schematic drawing of a transmission having a reverse gear and an axially displaceable shift gear, and embodying the improvements according to the present invention.

DETAILED DESCRIPTION OF THE PREFERRED EMBODIMENTS

In accordance with the present invention, an automobile transmission is contained in a transmission housing 1 and cooperating axle drive housing 2 adjacent thereto. A drive shaft 3 connected to the engine crankshaft by a clutch, not shown, acts as the input for the transmission. The output shaft 4 of the transmission is connected to the drive axle, not shown, in a conventional manner. A shift gear 6 rotates about a stationary axle 5, and is axially displaceable along the axle 5 for the purpose of shifting into reverse gear.

In the FIGURE, the drive shaft 3 and output shaft 4 have been represented as lying in a common plane with the stationary shaft 5. However, in practice, the stationary shaft 5 is displaced to one side with respect to a plane passing through the longitudinal axes of shafts 3 and 4.

Shift gear 6 is shown in its disengaged position in the drawing. As can be seen therein, when it is desired to shift into reverse, the shift gear 6 is displaced toward the right. The gear 6 first meshes with the reverse gear 8, which is contained on the drive shaft 3. Upon further displacement towards the right, the shift gear 6 meshes with the counter gear 7 on the output shaft 4. Thus there is attained a reverse in the direction of rotation between the drive shaft 3 and the output shaft 4, with a suitable transmission gear ratio corresponding to the respective numbers of teeth on the gears 7 and 8.

In the illustrated embodiment, the gear 7 is coupled to the output shaft 4 by a synchronizing device 9. The synchromesh device 9 acts to synchronize the shifting of the first and second gears: the gears 10 and 11 shown in the drawing associated with the first speed of the transmission, and the gears 12 and 13 with the second speed. In reality, these pairs of gears are constantly engaged with each other and are shown as separated in the drawing in order to better illustrate the present invention (i.e. the illustration of the three shafts 3, 4, and 5 in a common plane).

When the shift gear 6 is in its disengaged position, as shown in the drawing, it constantly engages a synchromesh ring gear 15, which is fixed on the drive shaft 3 and has a tooth profile corresponding to the reverse gear 8. In view of the fact that the shift gear 6, when meshing with the ring gear 15, is disengaged from the reverse gear, there is no drive force transmitted between the shift gear 6 and ring gear 15. The ring gear, therefore, may be formed of a non-metallic material, since strength is not essential. Preferably, the ring gear 15 consists of a rubber or plastic material, for example, acetal resin, so that even with constant meshing no gear noises are produced between the ring gear 15 and shift gear 6.

In the embodiment shown in the drawing, the ring gear 15 consists of a plastic material, for reduced noise, and is formed directly onto the drive shaft 3 by spraying. The drive shaft 3 is provided with a beading or knurling, indicated at 16, on its periphery to assist in this process. Alternatively, the ring gear 15 could be in the form of two plastic half shells which are fastened onto the drive shaft 3, for example by cementing, to be secured against twisting. In the case where the ring gear consists of a rubber like material, the ring gear 15 may be attached by vulcanizing onto the drive shaft 3.

Thus, in operation, by suitable choice of materials for the ring gear 15, a constant noiseless engagement is provided between the shift gear 6 and the ring gear 15 when the shift gear 6 and reverse gear 8 are disengaged. Upon shifting into reverse, since the ring gear 15 and thus the shift gear 6 rotate with the reverse gear 8 on the drive shaft 3, grinding between the shift gear 6 and the reverse gear 8, as the shift gear 6 is axially displaced, will not occur.

Furthermore, in the embodiment of the invention shown in the drawing, gear grinding between the shift gear 6 and the counter gear 7, upon further displacement to the right of the shift gear 6, will also not occur due to the synchronizing device 14. The reverse gear 8, formed on the drive shaft 3 and whose axial width is limited due to the necessary undercut for the two tool producing the teeth, engages the shift gear 6 only shortly before the shift gear 6 engages the counter gear 7 on the output shaft 4. However, between the time the shift gear 6 engages first the reverse gear 8 and then the counter gear 7, the synchronizing device 14 is actuated to brake the rotation of the shift gear 6 and thereby eliminate any grinding and gear clash of the shift gear 6 and counter gear 7. The operation of the synchronizing device 14 is described in greater detail in the aforementioned U.S. patent application Ser. No. 961,773, which is incorporated herein by reference.

Thus, a transmission according to the present invention not only may be shifted smoothly into reverse gear without the customary transmission gear grinding, but will operate in all forward gears without producing any gearing noises as would otherwise be caused if the reverse gear were in constant engagement with the shift gear.

Although the invention has been shown and described with reference to certain preferred embodiments thereof, variations and modifications of the invention will be apparent to those skilled in the art without departing from the inventive concepts disclosed herein. All such variations and modifications are intended to be within the scope of the present invention, as defined in the following claims.

I claim:

1. In an automobile transmission having a drive shaft with a reverse gear thereon, said reverse gear adapted to engage a shift gear axially displaceable on a stationary axle between a first position engaged with said reverse gear for operating in reverse and a second position disengaged from said reverse gear, the improvement comprising a synchromesh ring gear on said drive shaft having a tooth profile corresponding to that of said reverse gear and positioned axially adjacent to said reverse gear to engage said shift gear when said shift gear is in said disengaged position.

2. The improvement according to claim 1, wherein said ring gear is formed of a resilient material.

3. The improvement according to claim 2, wherein said ring gear is formed of a plastic or synthetic resin.

4. The improvement according to claim 2, wherein said ring gear is formed of a rubber-like material.

5. The improvement according to claim 1, wherein said drive shaft and ring gear are formed with cooperating surfaces for positive engagement.

6. The improvement according to claim 1, wherein said ring gear is cemented onto said drive shaft.

7. The improvement according to claim 3, wherein said ring gear is formed directly on said drive shaft by direct injection molding.

* * * * *